UNITED STATES PATENT OFFICE.

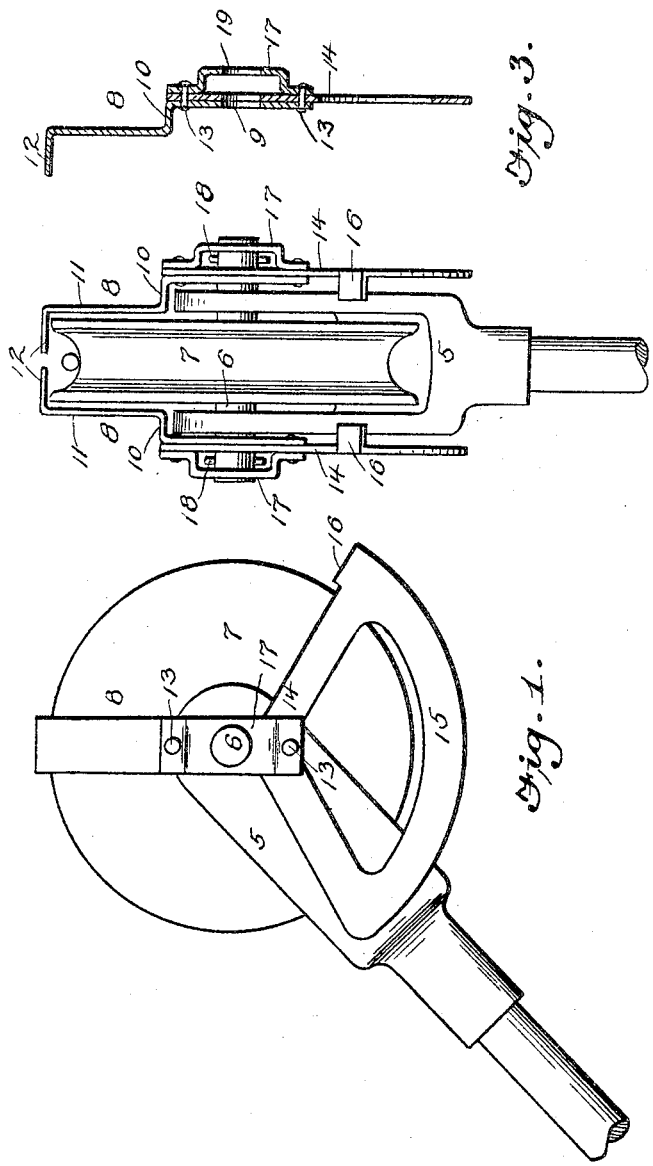

ALLEN P. LORD, OF BRADFORD, PENNSYLVANIA.

TROLLEY.

No. 807,477. Specification of Letters Patent. Patented Dec. 19, 1905.

Application filed January 9, 1905. Serial No. 240,226.

*To all whom it may concern:*

Be it known that I, ALLEN P. LORD, a citizen of the United States, residing at Bradford, in the county of McKean and State of Pennsylvania, have invented new and useful Improvements in Trolleys, of which the following is a specification.

My invention relates to trolleys, and more particularly a guard to prevent the wire from leaving the wheel.

The invention consists in a pair of guard-arms, which are journaled on the outer ends of the trolley-wheel axle and have counterbalanced lower ends, by reason of which they are caused to hang normally in a vertical position. When the arms come in contact with an obstruction, they will be depressed to permit such obstruction to pass, after which they swing back to their normal upright position.

In the accompanying drawings, Figure 1 is a side elevation of the invention, and Fig. 2 a rear elevation thereof. Fig. 3 is a vertical section of one of the guards.

Referring specifically to the drawings, 5 denotes a trolley-harp of the usual construction, which carries the axle 6, on which the trolley-wheel 7 is mounted. The guards are indicated at 8, being mounted on the extended ends of the axle on opposite sides of the wheel. They comprise thin strips of suitable spring metal, having openings 9 for the axle. The strips extend closely along the harp and inwardly, as at 10, over the outer end thereof, and then closely along the sides of the wheel, as at 11. The outer ends of the strips are bent inwardly, as at 12, to extend over the flanges of the wheel and come quite close together to prevent the wire from leaving the wheel. As the strips are flexible, the parts 12, which overhang the wheel, will bend in or out and permit the wire to pass to and from the wheel when the pole is raised or lowered. The strips will, however, be sufficiently stiff to prevent the wire from leaving the wheel accidentally when running.

The strips 8 are riveted or otherwise secured, as at 13, to arms 14, which are mounted on the extended ends of the axle. The arms are also flat and extend closely along the trolley-harp. Their lower ends are widened, as at 15, which therefore makes said ends heavier, and they act as a counterbalance to hold the arms and the strips 8 normally in a vertical position. The lower ends of the arms are bent inwardly, as at 16, which parts, by engaging the trolley-harp, act as stops and prevent the arms from swinging too far when they strike an obstruction.

At 17 are indicated strips, which are fastened to the arms 14 on the outside and are spaced therefrom to leave an opening for a pin or key 18, extending transversely through the axle, whereby the guards are retained on the axle. This arrangement also forms a guard or protection for the pin and prevents the same from catching wires or other obstacles, which it might do if exposed. The strips 17 also have openings 19, through which the axle extends. A sufficiently-wide bearing for the guards is thus had, and they are prevented from wabbling on the axle, which would interfere with their smooth working thereon.

The parts herein described are extremely simple and can therefore be cheaply made and sold. The guards lie close to the harp and wheel and will therefore readily pass through switches and clear all fixtures. If the guards come in contact with an obstruction, they will be depressed to permit such obstruction to pass, after which they swing back to their normal upright position. When the spring-strips are worn, they can be readily removed and replaced without the expense of an entire new guard.

Having thus described my invention, what is claimed as new, and desired to be secured by Letters Patent, is—

The combination with a trolley-wheel and its axle, of a pair of guards loosely hung on the axle, strips secured to the outer side of the guards and spaced therefrom, and keys extending through the axle, in the spaces between said guards and strips.

In testimony whereof I have signed my name to this specification in the presence of two subscribing witnesses.

ALLEN P. LORD.

Witnesses:
C. A. SPRETER,
P. F. SCHOONOVEN.